United States Patent
Yu et al.

(10) Patent No.: US 10,417,042 B2
(45) Date of Patent: Sep. 17, 2019

(54) DATA PERSISTENCE METHOD AND SYSTEM THEREOF IN STREAM COMPUTING

(71) Applicant: WANGSU SCIENCE & TECHNOLOGY CO., LTD., Shanghai (CN)

(72) Inventors: Zhifu Yu, Shanghai (CN); Huaming Liu, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 82 days.

(21) Appl. No.: 15/571,455

(22) PCT Filed: Feb. 21, 2017

(86) PCT No.: PCT/CN2017/074216
§ 371 (c)(1),
(2) Date: Nov. 2, 2017

(87) PCT Pub. No.: WO2018/129787
PCT Pub. Date: Jul. 19, 2018

(65) Prior Publication Data
US 2018/0307530 A1    Oct. 25, 2018

(30) Foreign Application Priority Data
Jan. 10, 2017    (CN) .......................... 2017 1 0017458

(51) Int. Cl.
| H04L 29/06 | (2006.01) |
| G06F 16/2455 | (2019.01) |
| G06F 9/48 | (2006.01) |

(52) U.S. Cl.
CPC ...... *G06F 9/4881* (2013.01); *G06F 16/24568* (2019.01); *H04L 65/60* (2013.01)

(58) Field of Classification Search
CPC .......................... G06F 9/4881; G06F 16/24568
See application file for complete search history.

(56) References Cited

U.S. PATENT DOCUMENTS

| 7,177,878 B2 * | 2/2007 | Wason | .................. G06F 16/289 |
| 7,389,378 B2 * | 6/2008 | Murai | .............. G11B 20/10527 |
| | | | 360/75 |

(Continued)

OTHER PUBLICATIONS

The European Patent Office (EPO) The Extended European Search Report for 17832726.8 dated Jun. 7, 2018 12 Pages.

(Continued)

*Primary Examiner* — Chat C Do
*Assistant Examiner* — Douglas M Slachta
(74) *Attorney, Agent, or Firm* — Anova Law Group, PLLC (57) ABSTRACT

The present disclosure provides a method and system for data persistence in stream computing, and the present disclosure belongs to the technical field of data storage. The method comprises: initiating, by a management module, a task; extracting a key corresponding to the task from a data source based on the task; acquiring a value corresponding to the key from the data source based on the key, performing data processing to generate intermediate data and a first signal, and storing the intermediate data and the first signal; detecting whether the first signal has been stored, and sending detection information to the management module. By using the present disclosure, the intermediate data persistence result may be effectively fed back, such that the intermediate data persistence may be ensured to be transactional.

18 Claims, 5 Drawing Sheets

(56) References Cited

U.S. PATENT DOCUMENTS

| | | | | |
|---|---|---|---|---|
| 8,381,224 B2* | 2/2013 | Huetter | | G06F 9/5066 707/607 |
| 8,689,231 B2* | 4/2014 | Milnor | | G06F 9/4881 718/106 |
| 2008/0215817 A1* | 9/2008 | Nonogaki | | G06F 12/0837 711/130 |
| 2009/0089772 A1* | 4/2009 | Di Balsamo | | G06F 9/5038 717/168 |
| 2009/0287837 A1* | 11/2009 | Felsher | | G06F 19/328 709/229 |
| 2010/0049935 A1* | 2/2010 | Pichumani | | G06F 16/24568 711/165 |
| 2010/0312801 A1* | 12/2010 | Ostrovsky | | G06F 16/1858 707/803 |
| 2012/0023498 A1* | 1/2012 | Sundararaman | | H04L 47/621 718/102 |
| 2013/0007007 A1* | 1/2013 | Pan | | G06F 16/2272 707/747 |
| 2015/0134795 A1* | 5/2015 | Theimer | | G06F 16/254 709/223 |
| 2015/0134797 A1* | 5/2015 | Theimer | | H04L 41/24 709/223 |
| 2016/0173599 A1* | 6/2016 | Chablani | | H04L 67/1097 709/217 |
| 2017/0091190 A1* | 3/2017 | Attias | | G06F 16/24568 |
| 2017/0255525 A1* | 9/2017 | Dain | | G06F 11/1453 |
| 2017/0270166 A1* | 9/2017 | Poppe | | G06F 16/245 |
| 2018/0129712 A1* | 5/2018 | Mankovskii | | G06F 16/24568 |

OTHER PUBLICATIONS

Irina Botan et al, "Transactional Stream Processing", Proceedings of the 15th International Conference on Extending Database Technology, EDBT'12, Mar. 27, 2012, pp. 204, New York, USA.

John Meehan et al, "Data Ingestion for the Connected World", Jan. 8, 2017, Retrieved from the Internet, URL: http://people.csail.mit.edu/tatbul/publications/sstore_cidr17.pdf.

John Meehan et al, "S-Store:Streaming Meets Transaction Processing", Proceedings of the VLDB Endowment, vol. 8, No. 13; [ACM Digital Library], Sep. 1, 2015, pp. 2134-2145, Assoc of Computing Machinery, New York, NY.

* cited by examiner

DATA PERSISTENCE METHOD AND SYSTEM THEREOF IN STREAM COMPUTING

CROSS-REFERENCES TO RELATED APPLICATIONS

This application is a national stage patent application of PCT application No. PCT/CN2017/074216, filed on Feb. 21, 2017, which claims priority to Chinese Patent Application No. 201710017458.1, filed on Jan. 10, 2017, the entire content of all of which is incorporated herein by reference.

FIELD OF THE DISCLOSURE

The present disclosure relates to the field of data storage technology and, more particularly, relates to a data persistence method and system thereof in stream computing.

BACKGROUND

Stream computing may well perform real-time analysis and processing on the massive data flow. Accordingly, the stream computing may be widely applied in social network, blog, email, video, news, phone record, transmission data, and electronic sensor. When the stream computing is utilized to perform data analysis and processing, a large amount of intermediate data that needs persistence may be generated. Currently, methods of data persistence in the stream computing mainly include a synchronous mode and an asynchronous mode. In particular, the synchronous mode needs to wait for the executing result of an operation to ensure the data persistence to be transactional when intermediate data persistence is performed. Such procedure causes the process to be in a standby status, thereby affecting the speed of data analysis and processing.

In existing technologies, steps of the asynchronous mode in the data persistence method in the stream computing include: starting, by a management module, a task; extracting, by a processing module, data corresponding to the task from a data source, performing, by the processing module, data processing to generate intermediate data and result data, and storing, by two storage modules, the intermediate data and the result data, respectively. Further, the management module again starts a new task. As such, the asynchronous mode may prevent the speed of the data processing from being affected, and the data analysis and processing can be fast.

In a process of implementing embodiments of the present disclosure, inventors find at least the following issues existing in the existing technologies:

In existing technologies, intermediate data persistence result may not be fed back, such that the intermediate data persistence can hardly be ensured to be transactional.

BRIEF SUMMARY OF THE DISCLOSURE

To solve existing technical issues, embodiments of the present disclosure provide a data persistence method and system thereof in stream computing. The technical solutions are as follows:

In the first aspect, embodiments of the present disclosure provide a data persistence method in stream computing, comprising:

initiating, by a management module, a task;
extracting, based on the task, a key corresponding to the task from a data source;
acquiring, based on the key, a value corresponding to the key from the data source, performing data processing to generate intermediate data and a first signal, and storing the intermediate data and the first signal;
detecting whether the first signal has been stored, and sending detection information to the management module.

Optionally, when the intermediate data and the first signal are generated, the first signal is inserted at end of the intermediate data.

Optionally, detecting whether the first signal has been stored, and sending detection information to the management module comprises:

Detecting whether the first signal has been stored by a polling mode, and when the first signal is detected to have been stored, sending a first success acknowledgment to the management module.

Optionally, detecting whether the first signal has been stored, and sending detection information to the management module further comprises:

when the first signal can not be detected, determining whether the number of times of detection reaches a preset threshold;

when the number of times of detection reaches the preset threshold, sending a failure acknowledgment to the management module, or when the number of times of detection has not yet reached the preset threshold, continuing to detect whether the first signal has been stored.

Optionally, after extracting, based on the task, the key corresponding to the task from the data source, the method further comprises:

comparing the key corresponding to the task with an execution list, when the key is not included in the execution list, adding the key to the execution list, acquiring a value corresponding to the key in the execution list from the data source based on the key in the execution list, and performing data processing to generate intermediate data and a first signal.

Optionally, the method further comprises:

when the management module receives the first success acknowledgment or the failure acknowledgment, generating a delete signal; and based on the delete signal, removing the first signal and the key corresponding to the task in the execution list.

Optionally, the method further comprises:

comparing the key corresponding to the task with an execution list, and when the key corresponding to the task is included in the execution list, adding the key to a waiting list; and comparing the key in the waiting list with the keys in the execution list, and when the key in the waiting list is not included in the execution list, adding the key in the waiting list to the execution list.

Optionally, the method further comprises:

when data processing is performed on the value corresponding to the key, generating result data;

performing storage on the result data, and sending a second success acknowledgment to the management module;

generating, by the management module, a tracking task based on the second success acknowledgment, and distributing the tracking task; and detecting, based on the tracking task, whether the first signal has been stored by the polling mode.

Optionally, the method further comprises:

storing, in the data source, the key in different data buckets based on a service type; and when the key corresponding to the task is acquired from the data source based on the task, extracting, based on the service type of the key, the key from a corresponding data bucket.

Optionally, the method further comprises:

generating, by the management module, a task strategy based on the number of keys in various service types in the data source, and initiating, by the management module, a task based on the task strategy.

In the second aspect, embodiments of the present disclosure provide a data persistence system in the stream computing, comprising:

a data source, configured to store a plurality of keys and a value corresponding to each key;

a management module, configured to start a task;

a coordination module, configured to extract a key corresponding to the task from the data source;

a processing module, configured to acquire, based on the key, a value corresponding to the key from the data source, and perform data processing to generate intermediate data and a first signal;

a first storage module, configured to store the intermediate data and the first signal; and a detection module, configured to detect whether the first signal has been stored, and send detection information to the management module.

Optionally, the processing module is further configured to:

when the intermediate data and the first signal are generated, insert the first signal at the end of the intermediate data.

Optionally, the detection module is configured to:

detect whether the first signal has been stored by a polling mode, and when the first signal is detected to have been stored, send a first success acknowledgment to the management module.

Optionally, the detection module is further configured to:

when the first signal can not be detected, determine whether the number of times of detection reaches a preset threshold;

when the number of times of detection reaches the preset threshold, send a failure acknowledgment to the management module, or when the number of times of detection has not yet reached the preset threshold, continue to detect whether the first signal has been stored.

Optionally, the coordination module is further configured to compare the key corresponding to the task with the execution list, and when the key is not included in the execution list, add the key to the execution list; and the processing module is configured to acquire, based on the key in the execution list, a value corresponding to the key in execution list from the data source, and perform data processing to generate intermediate data and a first signal.

Optionally, the management module is configured to receive the first success acknowledgment or the failure acknowledgment, and generate a delete signal;

the first storage module is further configured to remove the first signal based on the delete signal; and the coordination module is further configured to remove, based on the delete signal, the key corresponding to the task in the execution list.

Optionally, the coordination module is further configured to:

compare the key corresponding to the task with the execution list, and when the key corresponding to the task is included in the execution list, add the key to the waiting list; and compare the key in the waiting list to the keys in the execution list, and when the key in the waiting list is not included in the execution list, add the key in the waiting list to the execution list.

Optionally, the system further comprises a second storage module;

a processing module, further configured to, when data processing is performed on the value corresponding to the key, generate result data;

a second storage module, configured to store the result data, and send the second success acknowledgment to the management module;

a management module, further configured to generate a tracking task based on the second success acknowledgment, and distribute the tracking task; and a detection module, configured to detect, based on the tracking task, whether the first signal has been stored by the polling mode.

Optionally, the data source is configured to store keys in different data buckets based on the service type; and the coordination module is configured to extract, based on the service type of the key, a key from a corresponding data bucket.

Optionally, the management module is configured to:

generate a task strategy based on the number of keys in each service type in the data source, and start a task based on the task strategy.

Advantageous effects brought by technical solutions provided by embodiments of the present disclosure are as follows:

In the data persistence method in stream computing according to embodiments of the present disclosure, a task is initiated by the management module; based on the task, a key corresponding to the task is acquired from the data source; a value corresponding to the key is acquired from the data source based on the key and data processing is performed to generate intermediate data and a first signal, and the intermediate data and the first signal are stored; whether the first signal has been stored is detected, and detection information is sent to the management module. As such, the intermediate data persistence result may be effectively fed back, thereby ensuring the intermediate data persistence to be transactional.

BRIEF DESCRIPTION OF THE DRAWINGS

To more clearly illustrate technical solutions in embodiments of the present disclosure, the accompanying drawings need to be used for descriptions of the embodiments are briefly introduced hereinafter. Obviously, the accompanying drawings in the following descriptions are only some embodiments of the present disclosure, and for those ordinarily skilled in the relevant art, other drawings may be obtained according to such accompanying drawings without creative labor.

DETAILED DESCRIPTION

To make the object, technical solutions and advantages of the present disclosure more apparent, implementation methods of the present disclosure will be described more fully hereinafter with reference to the accompanying drawings.

Embodiments of the present disclosure provide a data persistence method in stream computing. An execution subject of such method is a stream computing system. The stream computing system primarily comprises a real-time computing system and a batch computing system. The disclosed data persistence method in stream computing may be widely applied to service types such as search engine, social network, blog, email, video, news, phone record, transmission data, and electronic sensor, etc., such that rapid processing of information flow is realized, and intermediate data persistence is ensured to be transactional.

Figure 1:
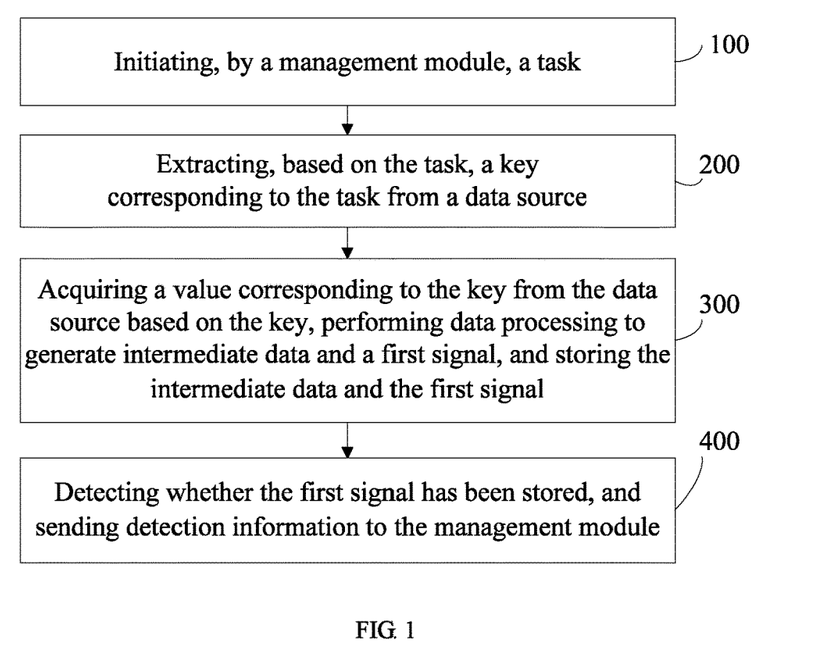
FIG. 1 illustrates a flow chart of a data persistence method in stream computing according to embodiments of the present disclosure.

Hereinafter, processing flow charts illustrated in FIG. 1-FIG. 5 are illustrated in detail with reference to specific implementation methods. The content may include:

Step 100, initiating, by a management module 2, a task.

In particular, the management module 2 is specifically a data spout in the stream computing system that is configured to, based on interaction between a user and the stream computing system, distribute the task and manage other functional modules.

More specifically, before the management module 2 distributes the task, a data source 1 needs to be bound. The data source 1 may be configured to store a plurality of keys and key-value data corresponding to each key. The data source 1 may provide the key-value data for the task initiated by the management module 2 bound to the data source 1, thereby allowing the stream computing system to perform data processing on the task.

Step 200, based on the task, extracting a key corresponding to the task from the data source 1.

In one embodiment, based on the need to execute the task, the key is acquired from the data source 1, and when data processing is needed subsequently, a value corresponding to the key is acquired from the data source 1 for data processing.

Optionally, the disclosed data persistence method in stream computing may further include: storing, in the data source 1, keys in different data buckets based on a service type. As such, after the keys are stored in different data buckets based on the service type, Step 200 is performed, where a key corresponding to the task is acquired from the data source 1 based on the task. More specifically, the key is acquired from a corresponding data bucket based on the service type of the key corresponding to the task. By storing the keys in different data buckets based on the service type, the task may be bound to a corresponding data bucket, and in a subsequent execution process, the speed of acquiring the key from the data source 1 is improved.

Optionally, in Step 100, initiating, by the management module 2, a task may specifically include:

Generating a task strategy, by the management module 2, based on the number of keys of each service type in the data source 1, and initiating, by the management module 2, a task based on the task strategy.

In one embodiment, the task strategy is a rule of the task initiated by the management module 2. The task strategy may be determined according to the number of keys of each service type, and the initiation order of a plurality of tasks to be initiated by the management module 2 may be affected, such that the priority of the plurality of to-be-initiated tasks may be determined. For example, in the plurality of to-be-initiated tasks, the number of keys in a service type corresponding to a task A may be the highest, such that the number of impact factors of such task may be considered to be relatively large and the task is relatively important that needs to be processed with high priority. That is, the management module 2 may preferably start the task A. Further, for example, to speed up an execution speed of a part of the tasks, the task with a small number of keys in a corresponding service type may be initiated first. It should be noted that, the protection scope of the present disclosure may not be limited to the task strategy generated based on the number of keys of each service type in the data source 1, and a corresponding task strategy may be configured based on requirement condition.

Step 300, acquiring a value corresponding to the key from the data source 1 based on the key, performing data processing to generate intermediate data and a first signal, and storing the intermediate data and the first signal.

In one embodiment, the first signal is a mark signal. The first signal has uniqueness and identifiability, and may be stored together with the intermediate data. Accordingly, the mark of the intermediate data may be fulfilled via the first signal. By detecting the first signal, tracking and feedback of the storage condition of the intermediate data may be realized.

In particular, the first signal may be a signal formed by identity (ID) of the task. Accordingly, the uniqueness, detection and recognition of the first signal corresponding to the intermediate data generated by each task may be ensured.

Optionally, when the intermediate data and the first signal are generated, the first signal is inserted at the end of the intermediate data. Accordingly, the first signal is integrated with the intermediate data as a whole, the first signal fulfills mark of the intermediate data, and detection is performed on the storage condition of the first signal. That is, the storage condition of the intermediate data is determined. For example, when the first signal is detected to have been stored, that means the intermediate data is determined to have been stored. When the first signal is detected not having been stored, that means the intermediate data is determined to not having been stored.

Step 400, detecting whether the first signal has been stored, and sending detection information to the management module 2.

In particular, the detection of the first signal may be fulfilled by a storage module configured to store the first signal, or may be fulfilled by means of the accessing of the other detection module. The start of the first signal detection may be realized by the management module 2 to distribute a task, the detection module receives the distributed task and access and detect the storage module configured to store the first signal. Or, the first signal detection may be started by the storage module configured to store the first signal, and when the storage module receives the first signal, detection thereof is started. Further, after the first signal is stored, the storage module for storing the first signal may be configured to automatically feed back information to the management module 2.

Figure 2:
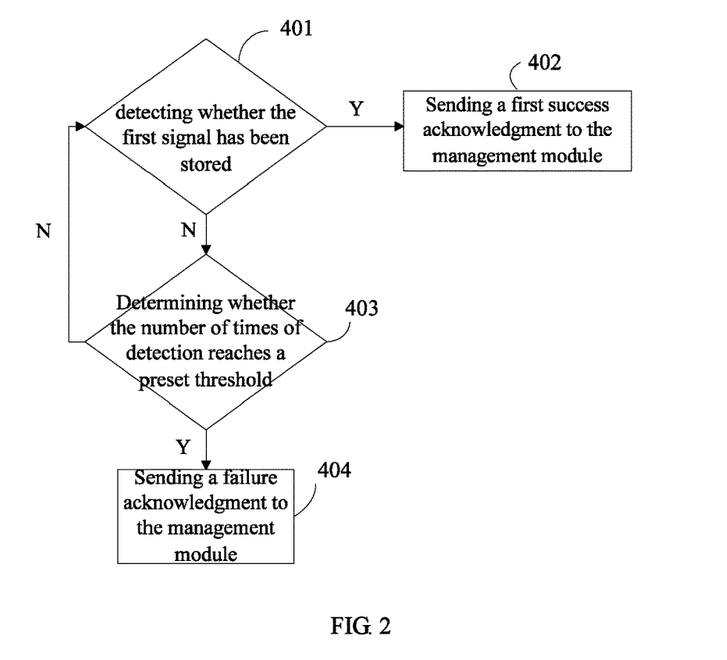
FIG. 2 illustrate a flow chart of step 400 according to embodiments of the present disclosure.

Referring to FIG. 2, optionally, in Step 400, detecting whether the first signal has been stored, and sending the detection information to the management module 2 specifically include:

Step 401, detecting whether the first signal has been stored by a polling mode;

Step 402, when the first signal is detected to have been stored, sending a first success acknowledgment to the management module 2;

Step 403, when the first signal cannot be detected, determining whether the number of times of detection reaches a preset threshold; and Step 404, when the number of times of detection reaches the preset threshold, sending a failure acknowledgment to the management module 2.

In particular, the number of times of detection of the first signal may be limited by the preset threshold, and when the number of times of detection of the first signal reaches the preset threshold, the operation of intermediate data persistence (storage) may be regarded as a failure. Such preset threshold may be determined based on time interval that each time the first signal is detected as well as the experience time. The experience time may refer to the time that, based on the experience, a signal that has not been stored fails to be stored in a certain period of time. The preset threshold may be equal to the experience time divided by the time interval that each time the first signal is detected, and the calculation result is rounded up to an integer. For example, the preset threshold may be 10, and when the first signal is not detected from a first time detection to a 10th time detection of the first signal, a failure acknowledgment is sent to the management module 2.

When the number of times of detection has not yet reached the preset threshold, detection of whether the first signal has been stored is continued, and Step 401 is jumped back to.

For example, when the preset threshold is 10 and the number of times of detection is 5, Step 401 may be returned to, and detection of the first signal may be continued till the first signal is detected to have been stored or until the first signal is detected not having been stored at the 10th time.

In one embodiment, when the management module 2 receives the first success acknowledgment, the operation of intermediate data persistence may be informed to be successful, and when the management module 2 receives the failure acknowledgment, the operation of intermediate data persistence may be informed to be failure; such that the management module 2 may make a corresponding reaction based on the persistence operation success and the persistence operation failure.

Figure 3:
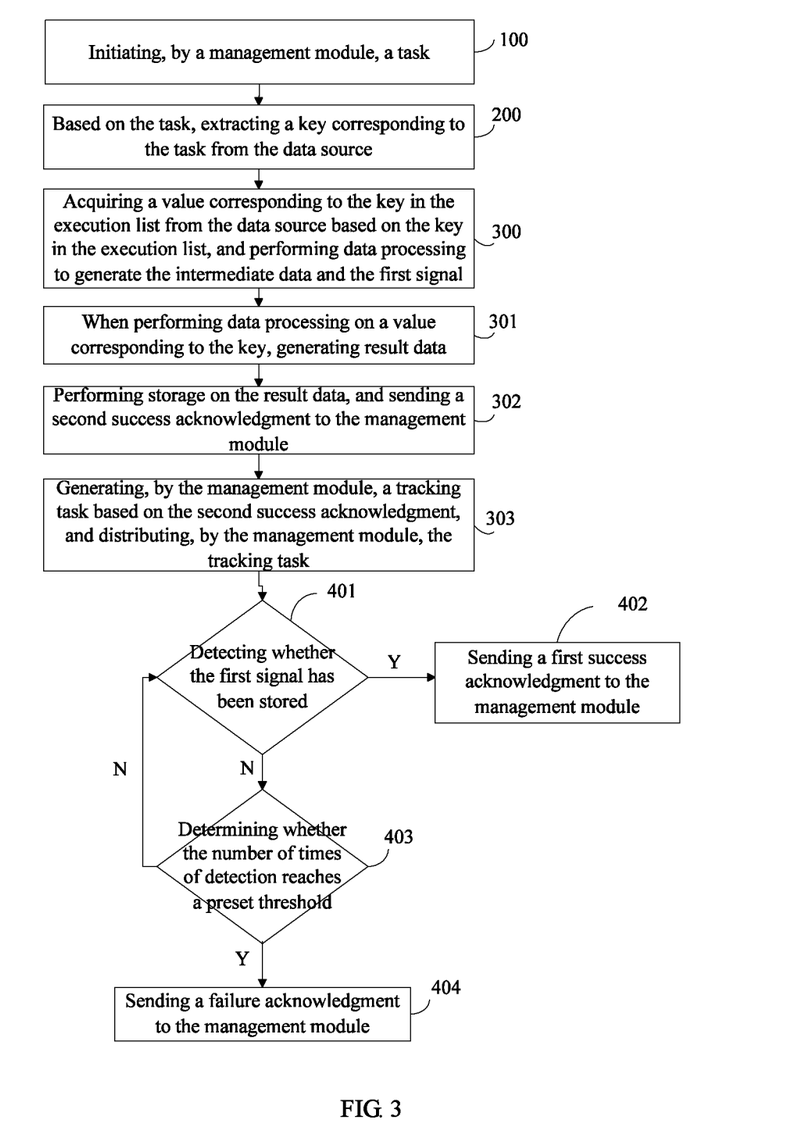
FIG. 3 illustrates a flow chart of another data persistence method in stream computing according to embodiments of the present disclosure.

Optionally, referring to FIG. 3, the data persistence method in the stream computing may further include:

Step 301, when performing data processing on a value corresponding to the key, generating result data;

Step 302, performing storage on the result data, and sending a second success acknowledgment to the management module 2;

Where, the result data and the intermediate data are stored in two different storage modules, and after the storage module configured to store the result data has stored the result data, the storage module sends out the second success acknowledgment.

Step 303, generating, by the management module 2, a tracking task based on the second success acknowledgment, and distributing, by the management module 2, the tracking task; detecting whether the first signal has been stored based on the tracking task by a popping mode, and Step 401 is entered.

In one embodiment, after receiving the second success acknowledgment, the management module 2 may actively perform detection on the first signal, thereby determining the storage condition of the intermediate data.

Figure 4:
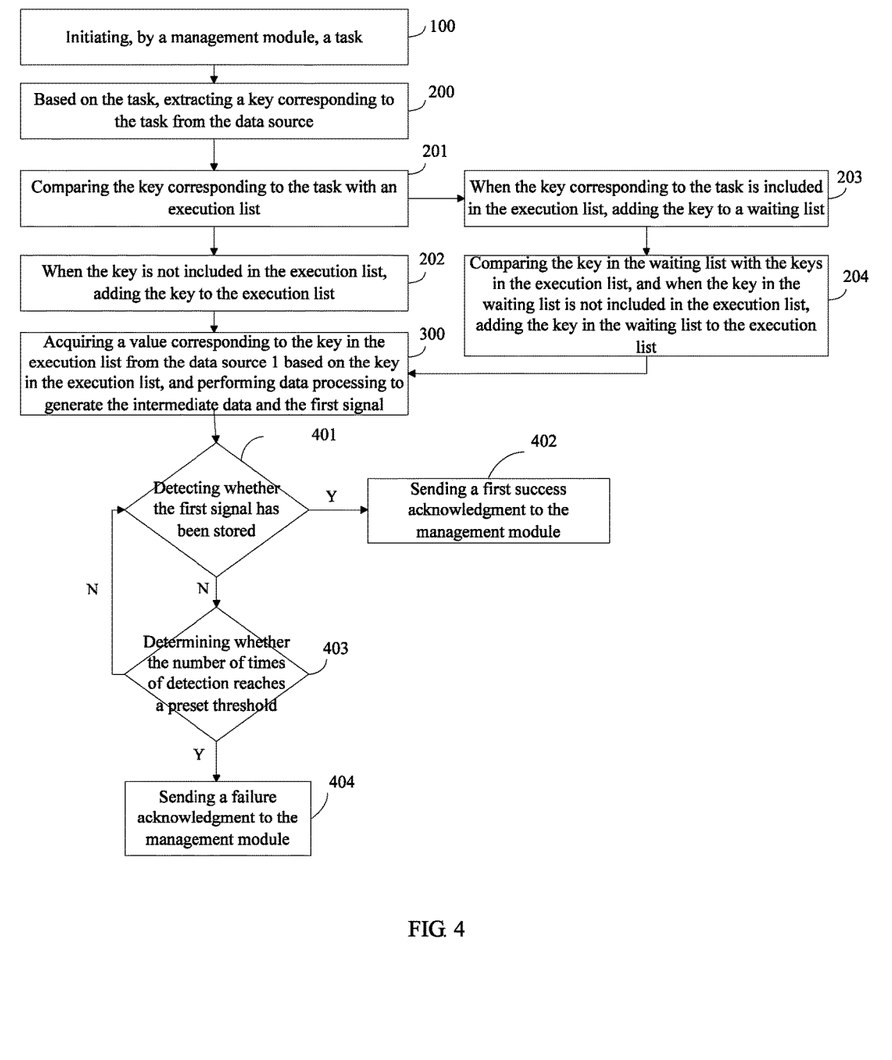
FIG. 4 illustrates a flow chart of another data persistence method in stream computing according to embodiments of the present disclosure.

Optionally, referring to FIG. 4, after Step 200 and before Step 300, the data persistence method in the stream computing may further include:

Step 201, comparing the key corresponding to the task with an execution list;

Where, the execution list is configured to provide the key for data processing.

Step 202, when the key is not included in the execution list, adding the key to the execution list.

Step 300 may specifically include: acquiring a value corresponding to the key in the execution list from the data source 1 based on the key in the execution list, and performing data processing to generate the intermediate data and the first signal. That is, after the key is added into the execution list, Step 300 is started to be performed.

In one embodiment, when the key is not included in the execution list, namely, the execution list includes no key the same as such key, the uniqueness of the key under execution at a same time may be ensured, thus further ensuring the task and the intermediate data generated thereof to be transactional.

Optionally, referring to FIG. 4, the data persistence method in stream computing may further include:

Step 203, when the key corresponding to the task is included in the execution list, adding the key to a waiting list; and Step 204, comparing the key in the waiting list with the keys in the execution list, and when the key in the waiting list is not included in the execution list, adding the key in the waiting list to the execution list.

More specifically, the key in the waiting list may be added into the execution list earlier with respect to the key corresponding to a newly initiated task.

Figure 5:
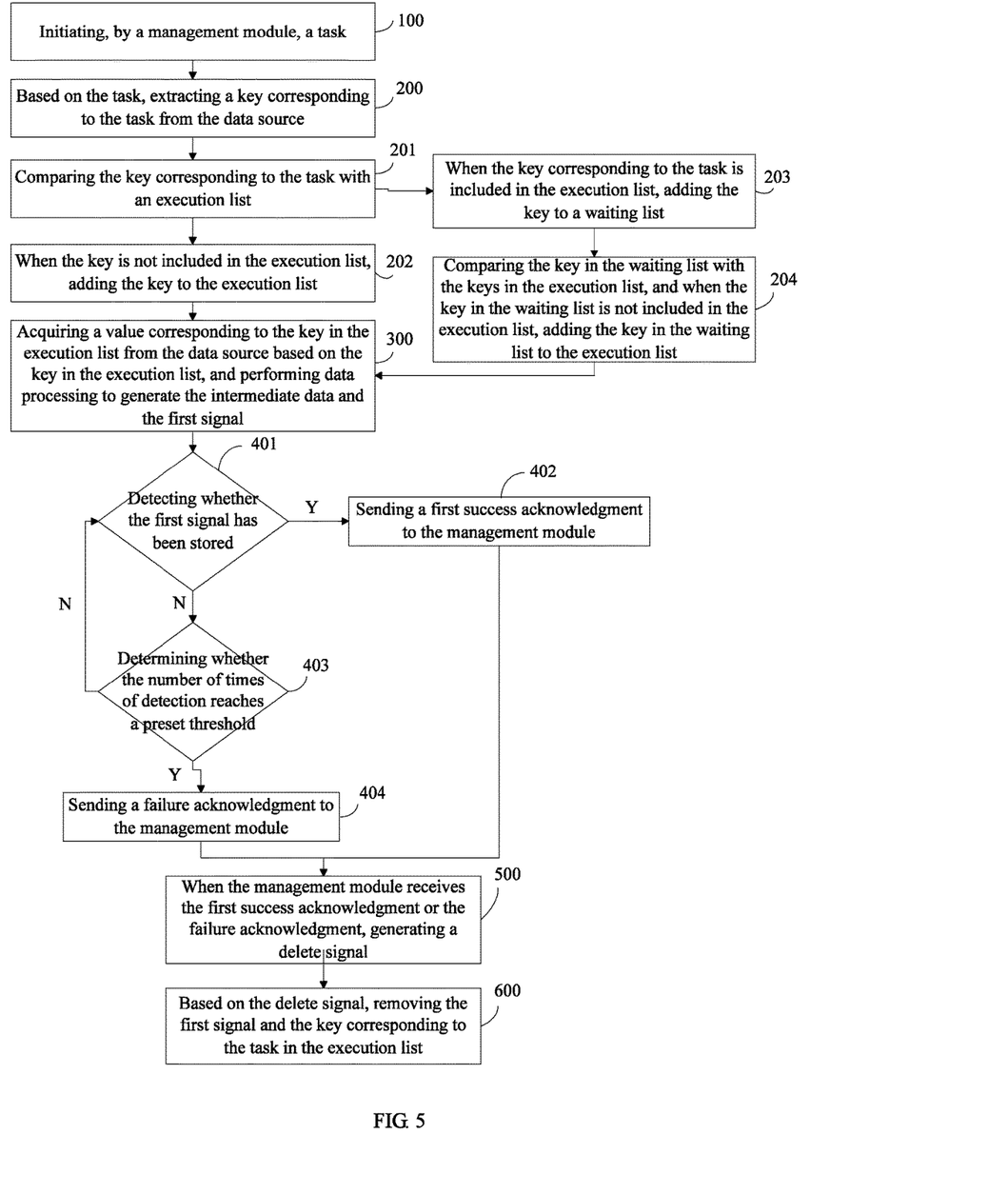
FIG. 5 illustrates a flow chart of another data persistence method in stream computing according to embodiments of the present disclosure.

Optionally, referring to FIG. 5, the data persistence method in stream computing may further include:

Step 500, when the management module 2 receives the first success acknowledgment or the failure acknowledgment, generating a delete signal; and Step 600, based on the delete signal, removing the first signal and the key corresponding to the task in the execution list.

In one embodiment, by using the management module 2 to receive the first success acknowledgment or the failure acknowledgment and remove the first signal and the key corresponding to the task in the execution list, the deletion of useless data in the storage module configured to store the intermediate data may be realized. Accordingly, a space may be cleared up for the key that has not been added into the execution list, such that the data persistence method in stream computing may be continuously implemented.

Optionally, when the number of the keys in the execution list reaches a preset upper limit, the key that has not been added into the execution list may be added into the waiting list, where the key in the waiting list may be sorted based on a time order. Under situations where it is ensured that no the same key exists in the execution list, the key that first enters the waiting list enters the execution list with priority.

In particular, those skilled in the relevant art may configure the preset upper limit of the execution list manually or based on the data processing ability of the execution body.

In the data persistence method in the stream computing provided by embodiments of the present disclosure, a task is initiated by the management module 2; a key corresponding to the task is acquired from the data source 1 based on the task; a value corresponding to the key is acquired from the data source 1 based on the key, data processing is performed to generate intermediate data and a first signal, and the intermediate data and the first signal are stored; whether the first signal has been stored is detected, and detection information is sent to the management module 2. As such, the intermediate data persistence result may be effectively fed back, thereby ensuring the intermediate data persistence to be transactional.

Figure 6:
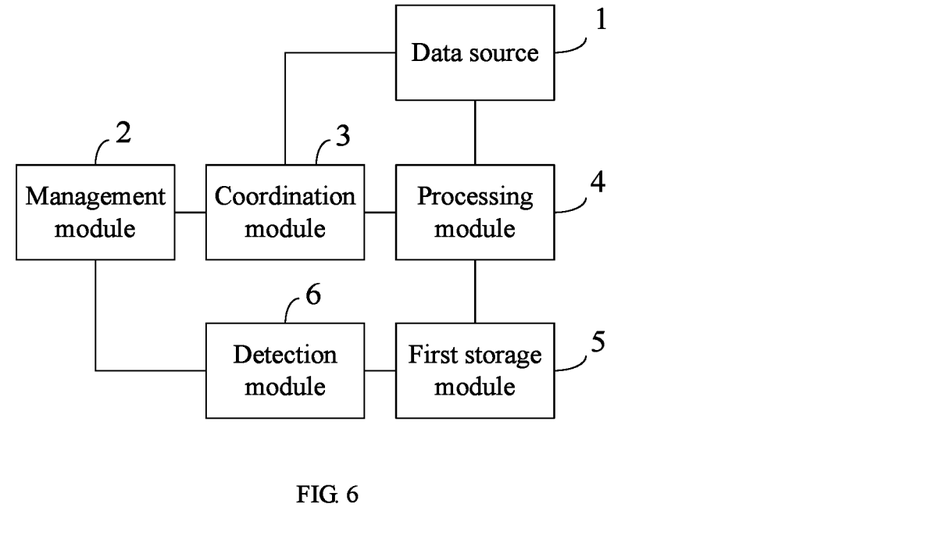
FIG. 6 illustrates a structural schematic view of a data persistence system in stream computing according to embodiments of the present disclosure.

Based on the same creative idea, embodiments of the present disclosure further provide a data persistence system in stream computing, and referring to FIG. 6, the system comprises:

a data source 1, configured to store a plurality of keys and a value corresponding to each key;

a management module 2, configured to start a task;

a coordination module 3, configured to, based on the task, extract a key corresponding to the task from the data source 1;

a processing module 4, configured to acquire a value corresponding to the key from the data source 1 based on the key, and perform data processing to generate intermediate data and a first signal;

a first storage module 5, configured to store the intermediate data and the first signal; and a detection module 6, configured to detect whether the first signal has been stored, and send detection information to the management module 2.

In particular, the first storage module 5 may be a redis (an open-resource Key-Value database compiled by using the ANSIC language that supports network and is log-structured showing persistence based on the memory).

In one embodiment, the detection module 6 may be configured in the first storage module 5.

Optionally, the processing module 4 may be further configured to:

When the intermediate data and the first signal are generated, insert the first signal at the end of the intermediate data.

Optionally, the detection module 6 may be configured to:

Detect whether the first signal has been stored by a polling mode, and when the first signal is detected to have been stored, send a first success acknowledgment to the management module 2.

Optionally, the detection module 6 is further configured to:

when the first signal can not be detected, determine whether the number of times of detection reaches a preset threshold;

when the number of times of detection reaches the preset threshold, send a failure acknowledgment to the management module 2, or when the number of times of detection has not yet reached the preset threshold, continue to detect whether the first signal has been stored.

Optionally, the coordination module 3 is further configured to compare the key corresponding to the task with the execution list, and when the key is not included in the execution list, add the key to the execution list; and the processing module 4 is configured to acquire, based on the key in the execution list, a value corresponding to the key in execution list from the data source 1, and perform data processing to generate intermediate data and a first signal.

Optionally, the management module 2 is configured to receive the first success acknowledgment or failure acknowledgment, and generate a delete signal;

the first storage module 5 is further configured to remove the first signal based on the delete signal; and the coordination module 3 is further configured to remove, based on the delete signal, the key corresponding to the task in the execution list.

Optionally, the coordination module 3 is further configured to:

compare the key corresponding to the task with the execution list, and when the key corresponding to the task is included in the execution list, add the key to a waiting list; and compare the key in the waiting list with the keys in the execution list, and when the key in the waiting list is not included in the execution list, add the key in the waiting list to the execution list.

Figure 7:
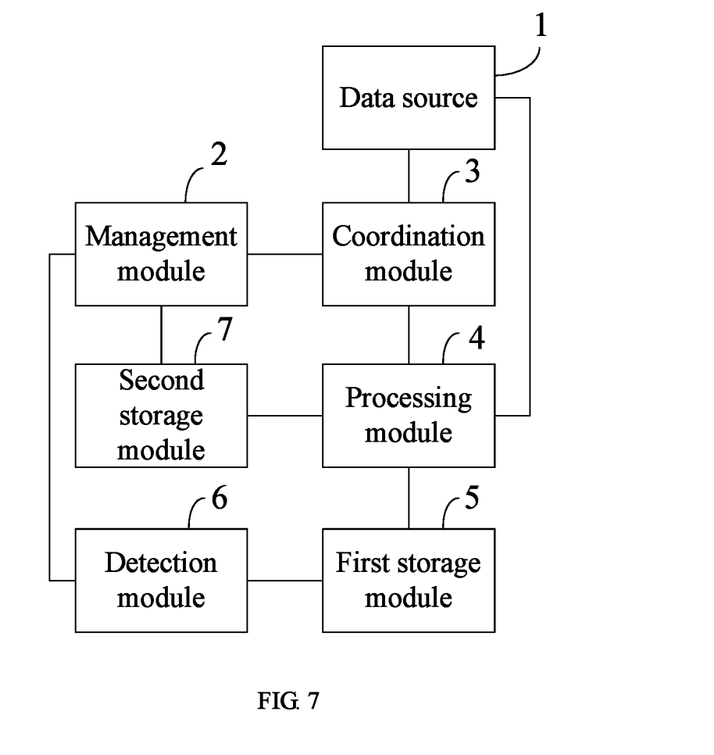
FIG. 7 illustrates a structural schematic view of another data persistence system in stream computing according to embodiments of the present disclosure.

Optionally, referring to FIG. 7, the disclosed data persistence system in stream computing further comprises a second storage module 7;

the processing module 4 is further configured to, when data processing is performed on the value corresponding to the key, generate result data;

a second storage module 7 is configured to store the result data, and send a second success acknowledgment to the management module 2;

the management module 2 is further configured to generate a tracking task based on the second success acknowledgment, and distribute the tracking task; and a detection module 6 is configured to detect, based on the tracking task, whether the first signal has been stored by the polling mode.

Optionally, the data source 1 is configured to store the keys in different data buckets based on the service type;

the coordination module 3 is configured to extract, based on the service type of the key, a key from a corresponding data bucket.

Optionally, the management module 2 is configured to:

generate a task strategy based on the number of keys in each service type in the data source 1, and start a task based on the task strategy.

In the data persistence system in stream computing provided by embodiments of the present disclosure, the data source 1 is configured to store a plurality of keys and a value corresponding to each key; the management module 2 is configured to start a task; the coordination module 3 is configured to, based on the task, extract a key corresponding to the task from the data source 1; the processing module 4 is configured to, based on the key, acquire a value corresponding to the key from the data source 1, and perform data processing to generate intermediate data and a first signal; the first storage module 5 is configured to store the intermediate data and the first signal; the detection module 6 is configured to detect whether the first signal has been stored, and send detection information to the management module 2. As such, the intermediate data persistence result may be effectively fed back, thereby ensuring the intermediate data persistence to be transactional.

The system embodiments described above are for illustrative purposes only, and the units illustrated as separate parts may be or may not be physically separated. The parts illustrated as units may be or may not be physical units. That is, the parts may be located in a same place, or distributed to a plurality of network units. A part of or all modules thereof may be selected to realize the object of solutions of the present disclosure based on the actual demand. Those ordinarily skilled in the relevant art may understand and implement the present disclosure without contributing creative labor.

Via the descriptions of the aforementioned embodiments, those skilled in the relevant art may clearly understand that each embodiment may be implemented using software and an essential universal hardware platform, or via the hardware. Based on such understanding, the nature of the aforementioned technical solutions or the part of the aforementioned technical solutions that contributes to the existing technique may be embodied in a form of software products. Such computer software product may be stored in a computer readable storage medium, such as ROM/RAM, magnetic disc, and optical disc, etc., that comprises a plurality of commands configured to allow a computing device (e.g., a personal computer, a server, or a network device, etc.) to execute each embodiment or methods described in some parts of the embodiments.

It should be illustrated that, the term "comprising" or any other variation are intended to include other non-exclusive including, such that a merchandise or system including a series of factors not only include such factors, but further include other factors that are not clearly listed out, or further include factors intrinsic to such merchandise or system. Under condition where no more restrictions exist, the factor defined by "comprising one" does not exclude additional same factors exist in the merchandise or system including such factor.

The aforementioned is only preferred embodiments of the present disclosure and is not configured to limit the present disclosure. Any modification, equivalent replacement, and improvement, etc. without departing from the spirit and principles of the present disclosure, shall all fall within the protection range of the present disclosure.

What is claimed is:

1. A data persistence method in stream computing, comprising:
    initiating, by a management module, a task;
    extracting, based on the task, a key corresponding to the task from a data source;
    acquiring, based on the key, a value corresponding to the key from the data source, performing data processing on the value corresponding to the key to generate intermediate data, a first signal corresponding to the intermediate data, and result data;
    storing the intermediate data, the first signal, and the result data;
    sending a success acknowledgment when successfully storing the result data and, based on the success acknowledgment of the result data, generating a tracking task;
    after successfully storing the result data, detecting, based on the tracking task, whether the first signal corresponding to the intermediate data has been stored, and sending detection information to the management module;
    after receiving the detection information corresponding to the intermediate data, generating a delete signal;
    based on the delete signal, removing the first signal from storage; and
    based on the delete signal, removing the key corresponding to the task from an execution list.

2. The method according to claim 1, wherein when the intermediate data and the first signal are generated, the first signal is inserted at the end of the intermediate data.

3. The method according to claim 1, wherein detecting whether the first signal has been stored, and sending the detection information to the management module comprise:
    detecting whether the first signal has been stored by a polling mode, and when the first signal is detected to have been stored, sending a first success acknowledgment to the management module.

4. The method according to claim 3, wherein detecting whether the first signal has been stored, and sending the detection information to the management module further comprise:
    when the first signal cannot be detected, determining whether a number of times of detection reaches a preset threshold; and
        when the number of times of detection reaches the preset threshold, sending a failure acknowledgment to the management module, or
        when the number of times of detection has not yet reached the preset threshold, continuing to detect whether the first signal has been stored.

5. The method according to claim 4, wherein after extracting, based on the task, the key corresponding to the task from the data source, the method further comprises:
    comparing the key corresponding to the task with the execution list, and when the key is not included in the execution list, adding the key to the execution list, and
    acquiring a value corresponding to the key in the execution list from the data source based on the key in the execution list, and performing the data processing to generate the intermediate data and the first signal.

6. The method according to claim 5, wherein the method further comprises:
    when the management module receives the first success acknowledgment or the failure acknowledgment, generating the delete signal.

7. The method according to claim 5, wherein the method further comprises:
    comparing the key corresponding to the task with the execution list, and when the key corresponding to the task is included in the execution list, adding the key to a waiting list; and
    comparing the key in the waiting list with keys in the execution list, and when the key in the waiting list is not included in the execution list, adding the key in the waiting list to the execution list.

8. The method according to claim 1, wherein the method further comprises:
    storing, in the data source, keys in different data buckets based on a service type; and
    when the key corresponding to the task is acquired from the data source based on the task, extracting, based on the service type of the key, the key from a corresponding data bucket.

9. The method according to claim 1, wherein the method further comprises:
    generating, by the management module, a task strategy based on a number of keys in each service type in the data source, and initiating, by the management module, the task based on the task strategy.

10. A data persistence system in stream computing, comprising:
    a computing device, configured to:
        store a plurality of keys and a value corresponding to each key;

start a task and extract a key corresponding to the task from the data source;

acquire, based on the key, a value corresponding to the key from the data source, perform data processing on the value corresponding to the key to generate intermediate data, a first signal corresponding to the intermediate data, and result data;

store the intermediate data, the first signal, and the result data;

send a success acknowledgment when successfully storing the result data and, based on the success acknowledgment of the result data, generate a tracking task;

after successfully storing the result data, detect, based on the tracking task, whether the first signal corresponding to the intermediate data has been stored, and sending detection information to the management module;

after receiving the detection information corresponding to the intermediate data, generate a delete signal;

based on the delete signal, remove the first signal from storage; and based on the delete signal, remove the key corresponding to the task from an execution list.

11. The system according to claim 10, wherein the computing device is further configured to:

when the intermediate data and the first signal are generated, insert the first signal at the end of the intermediate data.

12. The system according to claim 10, wherein the computing device is further configured to:

when the first signal is detected to have been stored, generate a first success acknowledgment.

13. The system according to claim 12, wherein the computing device is further configured to:

when the first signal cannot be detected, determine whether a number of times of detection reaches a preset threshold; and when the number of times of detection reaches the preset threshold, send a failure acknowledgment to the management module, or when the number of times of detection has not yet reached the preset threshold, continue to detect whether the first signal has been stored.

14. The system according to claim 13, wherein the computing device is further configured to:

compare the key corresponding to the task with the execution list, and when the key is not included in the execution list, add the key to the execution list; and based on the key in the execution list, acquire a value corresponding to the key in execution list from the data source, and perform the data processing to generate the intermediate data and a first signal.

15. The system according to claim 14, wherein the computing device is further configured to:

receive the first success acknowledgment or the failure acknowledgment, and generate the delete signal.

16. The system according to claim 14, wherein the computing device is further configured to:

compare the key corresponding to the task with the execution list, and when the key corresponding to the task is included in the execution list, add the key to a waiting list; and compare the key in the waiting list to keys in the execution list, and when the key in the waiting list is not included in the execution list, add the key in the waiting list to the execution list.

17. The system according to claim 10, wherein the computing device is further configured to:

store keys in different data buckets based on a service type; and based on the service type of the key, extract the key from a corresponding data bucket.

18. The system according to claim 10, wherein the computing device is configured to:

generate a task strategy based on a number of keys in each service type in the data source, and start the task based on the task strategy.

* * * * *